United States Patent [19]
Durot et al.

[11] Patent Number: 4,539,112
[45] Date of Patent: Sep. 3, 1985

[54] HORIZONTAL-AXIS AERATOR FOR PURIFICATION OF WASTE WATER

[75] Inventors: Jean Durot, Villepreux; Jacques Bernard, St. Germain en Laye, both of France

[73] Assignee: Société Degremont, Rueil Malmaison, France

[21] Appl. No.: 304,338

[22] Filed: Sep. 21, 1981

[30] Foreign Application Priority Data

Sep. 22, 1980 [FR] France .............................. 80 20303

[51] Int. Cl.$^3$ .............................. C02F 3/18; B01F 3/04
[52] U.S. Cl. ...................................... 210/219; 261/92
[58] Field of Search ............... 210/150, 194, 198.1, 210/219; 261/83, 91, 92; 416/178, 187, 197 R

[56] References Cited

U.S. PATENT DOCUMENTS

| | | | |
|---|---|---|---|
| 10,000 | 9/1853 | Irving | 416/178 |
| 70,083 | 10/1867 | Goodwin | 416/178 X |
| 89,777 | 5/1869 | Loud | 416/178 |
| 117,991 | 8/1871 | Darling | 416/178 |
| 929,129 | 7/1909 | Harder | 416/187 |
| 3,109,875 | 11/1963 | Schramm et al. | 261/92 |
| 3,458,176 | 7/1969 | Auler | 261/92 X |
| 3,473,790 | 10/1969 | Auler et al. | 210/219 X |
| 3,505,212 | 4/1970 | Huber | 210/219 X |
| 3,515,375 | 6/1970 | Roos | 261/92 X |
| 3,561,738 | 2/1971 | Galeano | 261/92 |
| 3,658,305 | 4/1972 | Newtson | 261/92 |
| 3,675,779 | 7/1972 | Grutsch et al. | 261/92 X |
| 3,757,950 | 9/1973 | Zebley | 210/219 X |
| 3,799,515 | 3/1974 | Geerlings | 261/92 |

FOREIGN PATENT DOCUMENTS 1247223 8/1967 Fed. Rep. of Germany ........ 261/92

*Primary Examiner*—Robert Spitzer
*Attorney, Agent, or Firm*—Wenderoth, Lind & Ponack

[57] ABSTRACT

A horizontal-axis aerator for use in a waste water purification system includes a cylinder having a horizontal axis, a first series of parallel blades on the surface of the cylinder and extending in directions nonparallel to the axis, and a second series of parallel blades on the surface of the cylinder and extending in directions nonparallel to the axis. The directions of the first series of blades are opposite to the directions of the second series of blades, with respect to the axis. The first and second series of blades intersect each other, such that upon the aerator being partially immersed in a body of waste water to be treated and being rotated therein, at any rotational position of the aerator about the axis, a constant portion of the total blade length of all of the blades of the aerator will be immersed in the waste water.

29 Claims, 3 Drawing Figures

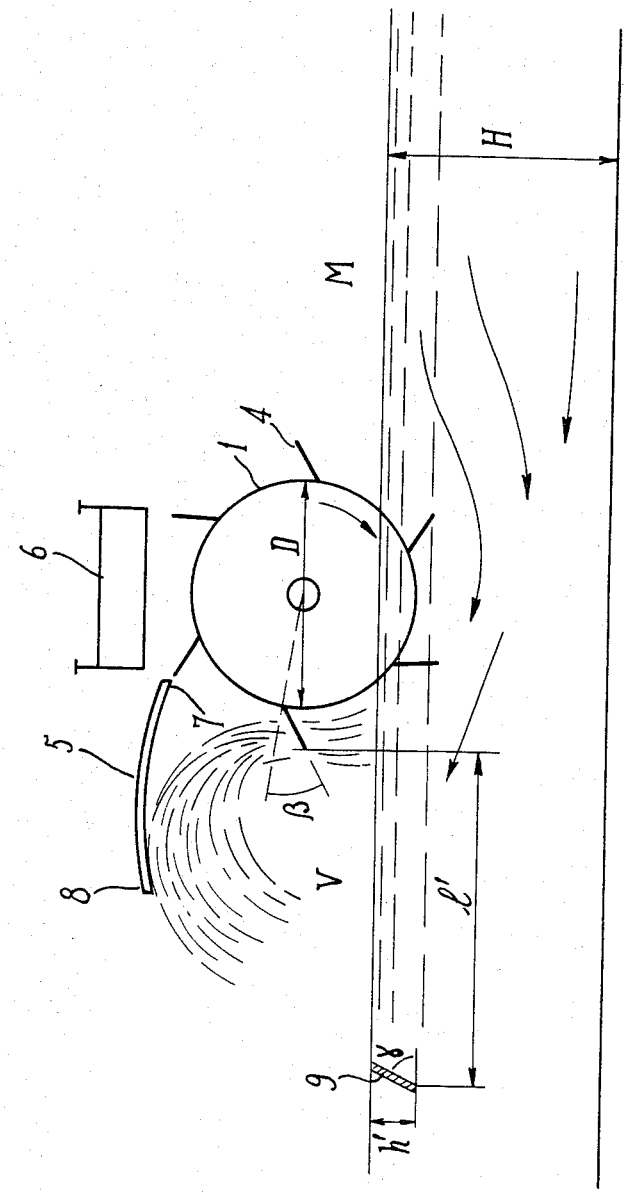

HORIZONTAL-AXIS AERATOR FOR PURIFICATION OF WASTE WATER

BACKGROUND OF THE INVENTION

The present invention relates to a horizontal-axis aerator and a purification system employing such aerator, particularly for use in the purification of waste water.

The biological purification of waste water loaded with organic pollution necessitates the introduction of oxygen into the water to assure the respiration and purifying action of the bacterial mass contained in the waste water. Introduction into the waste water of oxygen from the air above the upper surface of the waste water to be treated, and the dissolving of such oxygen into the waste water can be accelerated by means of a device located near the upper surface level of the waste water to be treated which by mechanical action causes an increase in the surfaces of contact between the air and the waste water.

A number of devices based on this general principle are known, and are generally termed mechanical aerators. Some such known aerators have vertical axes, are called aeration turbines and are generally employed in treatment tanks having a depth from 2.50 to 6.0 m. Other known devices have horizontal axes and are generally employed in shallower tanks, i.e. of a depth of from 1.3 to 4.0 m, and constructed as a channel having a closed loop configuration. Such horizontal axis aerators generally consist of a cylinder having a horizontal axis and equipped with elements forming a multiplicity of blades.

Such known devices, when utilized for the purification of residual water, must achieve both an oxygenation function and a mixing and homogenization function of the waste water contents of the particular treatment tank. Indeed, in order to achieve effective contact between the microorganisms and the pollutants, it is essential that all of the particles contained in the waste water to be treated be held in suspension, simultaneously with oxygenation.

When the treatment tank is constructed in the form of a channel having a closed loop configuration, mixing is obtained by assuring an adequate horizontal circulation speed for the liquid within the tank. For reasons of investment savings, generally both the oxygenation and mixing functions are assured by means of a single horizontal axis aerator arranged across one or all of the branches of the channel having the closed loop configuration.

However, while the needs for suspension and mixing remain substantially constant, in contrast the amounts of oxygen to be introduced per unit of waste water volume in the biological treatment tank may vary within very broad limits. Oxygenation needs in fact vary from one installation to another, and within a single installation from one hour of the day to another. That is, in so called "heavy load" purification stations, for which the quantity of pollution may be expressed as daily weight of $BOD_5$ added per unit of tank volume, the oxygenation needs are sharply greater per unit of tank volume than in lighter load installations, such as for example the so called "extended aeration" stations which may also provide nitrification of the ammoniacal and organic nitrogen contained in a raw effluent.

Furthermore, in a given installation and in a given day the hourly pollution flow, which may be expressed for example as hourly weight of $BOD_5$ supplied, arriving at the intake of the biological treatment tank of the purification installation of a community may vary within very broad limits. The pollution flow may frequently be ten to twenty times higher during some peak hours of the day than during slack night hours. Oxygenation needs therefore vary within very broad limits throughout the day.

It is thus worthwhile to have aerators having a mixing or "pumping" capacity which is high even for operating speeds bringing in only a low oxygen supply. This avoids keeping aerators in service for purely hydraulic reasons when the oxygen needs of the particular bacterial mass do not necessitate it. To date, efforts have primarily been directed to improving the specific oxygen supply, which is represented by the relationship of the weight of oxygen introduced divided by the energy consumed, of horizontal-axis aerators by dividing the amount of water displaced by the action of the device and by facilitating the introduction of air into the liquid as soon as the aerator has been placed in contact with the liquid, i.e. upstream from the aerator. The design and construction of the blades on the surfaces of most horizontal-axis aerators is carried out with a two fold goal. That is, the number of blades is quite large, i.e. several tens of blades per meter of the device, and the blade shape includes many sharp angles. The blades are often wider at the periphery of the aerator than at the area of attachment of the blades to the cylinder. The unit surface of each blade is low, on the order of one square decimeter. The blades are most often placed to extend along diametral planes passing through the axis of the cylinder.

However, the known designs of horizontal-axis aerators have certain inherent disadvantages. Thus, the pumping capacity of such known aerators is low. To ensure a minimum mixing, known aerators often consume a level of power greater than required by the oxygenation needs. This leads to the risk of over-oxygenating the activated sludge liquid. The small dimensions of the blades of known horizontal-axis aerators results in a major portion of the volume of water displaced by each blade escaping over the lateral edges of such blade and being picked up by following blades. Accordingly, the real or true efficiency of the pumping operation, intended to assure both circulation within the channel and renewal of those liquid portions or streams which are poorest in oxygen, is relatively low.

Also, downstream of the aerator, that liquid displaced by the blades is lifted upwardly and is uselessly projected relatively highly above the surface of the liquid. This is an unnecessary expenditure of energy. Furthermore, it often occurs that a substantial amount of the flow is driven by the blades in a manner such that it is returned or recycled upstream of the aerator. This phenomenon is a result of a combination of the driving effect of the blades and centrifugal forces. Such recycled flow results in a reduction in the real or actual pumping capacity of the aerator. Furthermore, such recycled flow has a high dissolved oxygen content which is unfavorable to a major supply of oxygen from the atmosphere.

Yet further, the attachment to the cylinder of a multiplicity of blades of small dimensions with high height to width ratios, for example on the order of from 2 to 5, is a delicate operation, and the resistance of such relatively small blades to repeated bending stresses during operation of the aerator is limited.

SUMMARY OF THE INVENTION

With the above discussion in mind, it is the object of the present invention to provide an improved horizontal-axis aerator and purification system employing such aerator, particularly for the purification of waste water, which overcomes the disadvantages of the prior art.

It is a further object of the present invention to provide such an improved horizontal-axis aerator and purification system wherein there is achieved a strong mixing capacity and which provide a more favorable energy utilization balance than is possible in existing aerators and systems.

It is yet a further object of the present invention to provide such an improved horizontal-axis aerator and purification system whereby it is possible to very substantially increase the mechanical resistance and reliability of the equipment, which is always installed under very severe service conditions, for example open air installations, liquid loaded with voluminous, fibrous and more or less hard materials in suspension, and hasty maintenance.

The above objects are achieved in accordance with the present invention by the provision of a horizontal-axis aerator employed in a purfication system, the aerator including a cylinder, a first series of parallel blades on the surface of the cylinder and extending in directions nonparallel to the axis of the cylinder, and a second series of parallel blades on the surface of the cylinder and extending in directions nonparallel to the axis of the cylinder. The directions of the first series of blades are opposite to the directions of the second series of blades, taken with respect to the axis. The first and second series of blades intersect each other, such that when the aerator is partially immersed in a body of waste water to be treated and is rotated therein, at any rotational position of the aerator about the axis a constant portion of the total blade length of all of the blades of the aerator will be immersed in the waste water.

Each of the blades of the first and second series of blades is divided into plural blade sections at the points of intersection of the first and second series of blades, and each such blade section has a full length in the respective direction of at least 0.5 m.

The cylinder is preferably hollow, and the blades are preferably rigid.

The difference between the diameter of the aerator including the cylinder and the blades and the diameter of the cylinder alone is less than 0.4 times the diameter of the aerator.

The first and second series of blades are connected to the surface of the cylinder along helical lines of connection. Each such line of connection forms an angle of from 5° to 20° with the generatricies of the surface of the cylinder.

Each blade extends from the surface of the cylinder in an inclined direction opposite to the direction of rotation of the cylinder. Each blade is inclined to the surface of the cylinder and has a line of greatest slope forming with the radius of the cylinder a constant angle of from 30° to 60°. This angle is preferably 45°.

In an advantageous arrangement, the cylinder is from 600 to 1000 mm, and the length of the cylinder is less than or equal to 10 m.

The blades divide the periphery of the surface of the cylinder into from six to twelve equal sized surface sections.

BRIEF DESCRIPTION OF THE DRAWINGS

The above and other objects, features and advantages of the present invention will be apparent from the following detailed description, taken with reference to the accompanying drawings, wherein:

FIG. 3 is a schematic end view of the aerator mounted with respect to a channel of waste water to be treated.

DETAILED DESCRIPTION OF THE INVENTION

With reference now to the drawings, one embodiment of a horizontal-axis aerator and a purification system employing such aerator will be described, without intending to limit the scope of the invention to the specifically described and illustrated structural features.

Thus, the horizontal-axis aerator of the present invention includes a cylinder 1 having a diameter D and a length L. The cylinder 1 is preferably hollow and is closed at its opposite ends by two support members 2, each having a boss or flange 3 having extending therefrom a tail shaft. The tail shafts may be supported on conventional support structure, not shown, attached either to lateral edges of a channel or tank containing waste water to be treated, or to a unit including a bridge (e.g. as schematically shown at 6 in FIG. 3) straddling the channel. The shaft and cylinder may then be rotated in a known fashion by a suitable drive unit. It will be understood that other constructions of the cylinder and particularly the manner of support, mounting and rotating thereof will be apparent to those skilled in the art.

The cylinder 1 has a longitudinal axis, and the cylinder is mounted with such axis extending horizontally, as particularly shown in FIG. 3.

The cylinder 1 has attached to the outer surface thereof a first series of parallel blades 4 which extend in directions nonparallel to the axis of the cylinder. Also, a second series of parallel blades 4 are attached to the outer surface of the cylinder and extend in directions nonparallel to the axis of the cylinder. The directions of the first series of blades are opposite to the directions of the second series of blades, with respect to the axis of the cylinder. This relationship is particularly illustrated in FIGS. 1 and 2 of the drawings.

Figure 2:
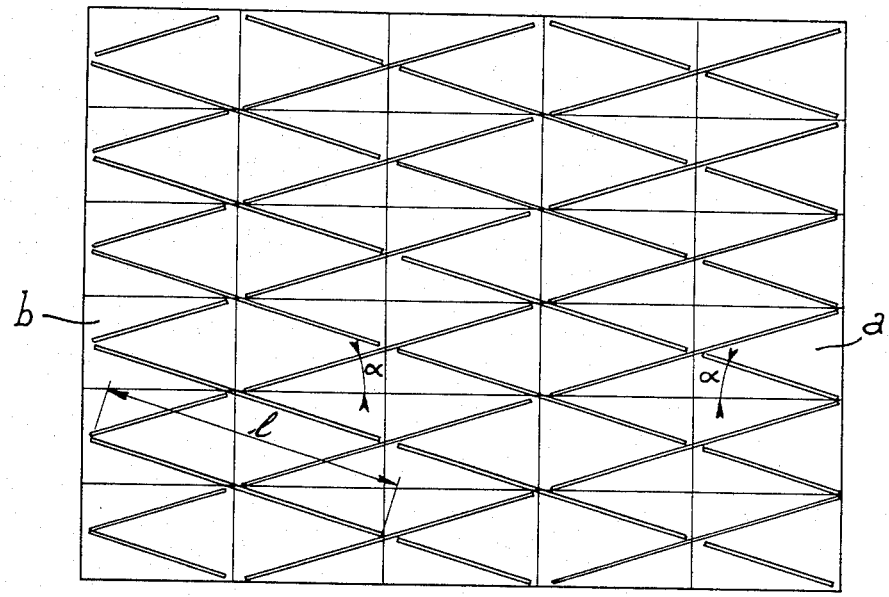
FIG. 2 is a view from above of a development of the external surface of the aerator of FIG. 1.
Figure 1:
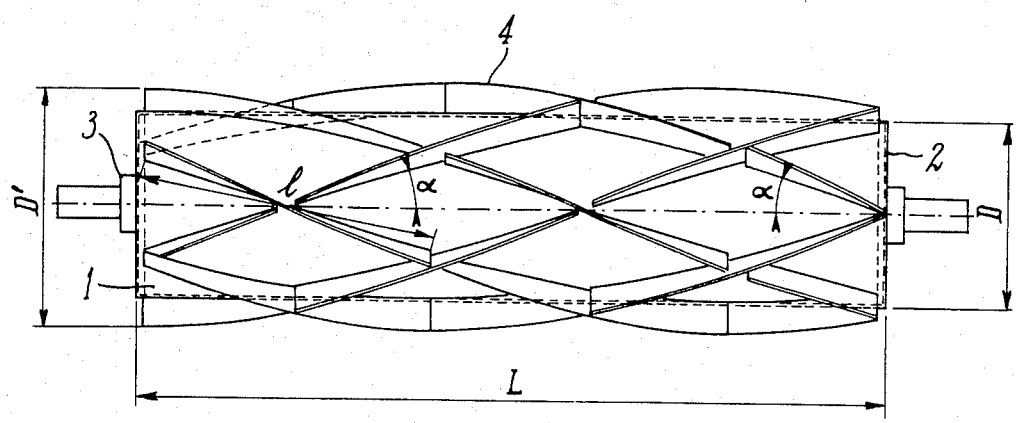
FIG. 1 is an elevation view showing the exterior of one embodiment of an aerator in accordance with the present invention.

As further will be particularly apparent from FIGS. 1 and 2 of the drawings, the first and second of series of blades 4 intersect each other, such that upon the aerator being partially immersed in a body of waste water to be treated (as shown in FIG. 3) and being rotated therein, at any rotational position of the aerator about the axis, a constant portion of the total blade length of all of the blades of the aerator will be immersed in the water. More specifically, at any rotational position of the cylinder 1, there will be a constant amount or length of immersed blades, among the total amount or length of the blades. This constant amount or length of immersed blades results in a constant pumping action at any speed of rotation.

Each of the blades of the first and second series of blades 4 is divided into plural blade sections at the points of intersection of the first and second series of blades. This is shown in FIG. 1, and is even more clearly shown in FIG. 2. Each blade section has a full length l in the respective direction of at least 0.5 m and preferably between 0.5 and 1.5 m. The blade sections having this relatively long overall or spread out length enables the aerator to pump large amounts of water from upstream of the aerator toward downstream of the aerator without any variation in power, aeration of the water being achieved substantially downstream of the cylinder.

The cylinder is preferably hollow, as mentioned above, and furthermore is preferably rigid and may be made of a metal material or a plastic material. The blades are rigid or semi-rigid and are made of a metal material, a plastic material or an elastomer.

The diameter D of cylinder 1 and the diameter D' of the aerator including the cylinder 1 and the blades 4 is such that D' minus D is less than 0.4 D'.

The emersion depth of the blades is advantageously between $D'-D/3$ and $D'-D$.

The first and second series of blades are connected to the surface of the cylinder 1 along lines of connection which form a constant angle of $\alpha$ of from 5° to 20° with the generatricies of the surface of the cylinder. In a preferred arrangement of the invention, the lines of connection of the blades to the surface of the cylinder are helical lines of connection.

As shown in FIG. 2, which is a displayed and projected view of the external surface of the aerator, the two series of parallel and oppositely directed helical blades divide the circumferential periphery of the cylinder into from six to twelve (six in the illustrated embodiment) equal sized surface sections. These surface sections are spaced from one another at regular intervals of from 150 to 450 mm, the diameter D of the cylinder being between 600 and 1000 mm. The blades may be attached to the cylinder permanently, for example by soldering or welding, or may be detachably mounted.

With reference to FIG. 2 of the drawings, the lateral areas a, b of the surface of the cylinder may be equipped with blades extending in both directions, may be equipped with blades extending in only one direction, or may have no blades therein, depending upon any correction that is to be made due to inequalities in the circulation of the water within the tank or channel due to curves therein. Indeed, depending on whether or not the end areas a or b are equipped with blades, orientation of the flow within the channel may be favored toward one side or the other thereof.

FIG. 3 illustrates an aerator according to the present invention mounted above a channel of waste water to be treated, the cylinder 1 being rotated in the direction indicated by the arrow, and the water to be treated circulating from upstream M toward downstream V with respect to the aerator. The blades 4 are inclined with respect to the surface of the cylinder 1 in directions opposite to the direction of rotation of the cylinder. Each blade has a line of greatest slope forming with the radius of the cylinder 1 a constant angle $\beta$ of from 30° to 60°, preferably 45°, in a direction opposite to the direction of rotation of the cylinder. By rotating the aerator in the direction indicated by the arrow at a peripheral speed at the outer ends of the blades of from 2 to 5 m/sec, and preferably 3 to 4 m/sec, the blades drive a large quantity of water from upstream of the aerator to downstream of the aerator. A major portion of the water displaced by the aerator is projected above the plane of the upper surface of the aerator downstream of the cylinder, and is thus aerated.

A deflector hood 5 may be positioned at a location adjacent the downstream area of the aerator. Deflector hood 5 makes it possible to deflect in a downstream direction of the aerator waste water which is driven upwardly from the surface of the body of waste water by the blades 4. The deflector hood 5 is advantageously attached to bridge 6. The upstream portion 7 of hood 5 is arranged in the immediate vicinity of the ends of the blades 4 adjacent their highest position during the rotation of the aerator. The downstream portion 8 of the hood 5 extends away from the aerator. Water lifted upwardly above the upper surface of the body of water by the blades 4 will ricochet against deflector hood 5 and be divided into droplets.

The provision of the blades 4 being inclined at angles to the surface of the cylinder 1, in directions opposite to the direction of rotation of the cylinder, provides a substantial advantage. Thus, as the blades leave the water at the downstream area of the aerator, the resultant of two components of the water speed, i.e. the displacement speed of the blade and the relative speed of the water on the blade, is close to horizontal. This facilitates the displacement of a large quantity of water in the downstream direction. The inclination of the blades in directions reverse to the direction of rotation of the cylinder thereby additionally makes it possible upstream of the aerator to guide the liquid streams toward the bottom of the channel, thereby avoiding a slowdown in the speed at the bottom of the channel and the formation of deposits and the development of fermentation harmful to the activity of the biological sludge. The inclination of the blades in directions reverse to the direction of rotation of the cylinder, as well as the assembly of the blades along lines of connection forming angle $\alpha$ with respect to the generatricies of the cylinder, reduce the resistance of the blades to entry into the water upstream of the aerator. Because of the low turbulence in the upstream area of the aerator, and slight depressions behind the blades, the amount of air bubbles driven into the liquid in a downstream direction is much lower than in existing horizontal-axis aerators with a very large number of smaller size blades. This apparent drawback is however largely compensated for by a much better hydraulic output of the device and by a sharp increase in the flow for a given power. This increase in flow is favorable to the overall energy output of the aerator.

The inclination of the blades in directions reverse to the direction of rotation of the cylinder further aids in avoiding any action of the blades and centrifugal force from returning already aerated water back to the upstream area of the aerator. This of course is further facilitated by the provision of deflector hood 5. This is advantageous, since the capacity of the pump, with respect to real water pumped, is thereby increased. This enables the power consumption to be reduced, i.e. the utilization of an aerator of a lesser pumping capacity to achieve treatment of a given channel installation. At equal power consumption and at equal total blade surface, these arrangements of the present invention assure a flow through the aerator, as well as a pumping and circulation effect in the channel, that are more significant than in known arrangements.

It has been found that the very appreciable increase in the flow circulated to the detriment of the intensity of dispersion of the liquid in the atmosphere nonetheless makes it possible to achieve specific oxygenation supplies (kg $O_2$ introduced per Kwh consumed) equivalent to those obtained in the best existing horizontal-axis aerators. Thus, in accordance with the present invention, an energy savings is achieved during periods of operation with reduced oxygenation needs when energy expenditures for purposes of mixing predominate. This advantageous pumping energy output is particularly favored by the inclination of the blades in directions reverse to the direction of rotation of the cylinder.

The purification system may additionally have, as illustrated in FIG. 3, a water guide 9 positioned within the body of the waste water and extending across the entire width thereof at a location downstream of the aerator to guide the flow of waste due to rotation of the aerator. The water guide 9 is positioned with the upper edge thereof at the surface of the body of waste water and is inclined in an upstream direction at an angle $\gamma$ to the horizontal of from 40° to 60°. The height h' of the water guide 9 is from 0.1 to 0.3 times the depth H of the body of waste water. The water guide 9 is spaced downstream from the downstream most edge of the blades of the aerator by a horizontal distance l' in meters such that $$\frac{V^2}{2g} < l' < 2.5 \frac{V^2}{2g},$$

wherein V equals the peripheral speed at the outer ends of the blades in m/sec, and g equals 9.81 m/sec$^2$.

Although the present invention has been described and illustrated with respect to a specifically preferred embodiment thereof, it is to be understood that such embodiment is exemplary only, and that various modifications and changes as will be apparent to those skilled in the art may be made to the specifically described and illustrated embodiment without departing from the scope of the present invention.

We claim:

1. A waste water purification system comprising:
   an aerator in the form of a cylinder, a first series of parallel blades on the surface of said cylinder and extending in directions nonparallel to the axis of said cylinder, and a second series of parallel blades on said surface of said cylinder and extending in directions nonparallel to said axis of said cylinder, said directions of said first series of blades being opposite to said directions of said second series of blades with respect to said axis;
   means for mounting said aerator across a body of waste water to be treated, with a portion of said blades immersed in said water and with said axis extending horizontally, and for rotating said aerator about said axis;
   said first and second series of blades intersecting each other, such that at any rotational speed of said aerator about said axis a constant portion of the total blade length of all of said blades of said aerator will be immersed in said waste water; and
   each said blade being inclined with respect to said surface of said cylinder in a direction opposite to the direction of rotation.

2. A system as claimed in claim 1, wherein each of said blades of said first and second series of blades is divided into plural blade sections at the points of intersection of said first and second series of blades, and each said blade section has a full length in the respective said direction of at least 0.5 m.

3. A system as claimed in claim 1, wherein said cylinder is hollow.

4. A system as claimed in claim 1, wherein said blades are rigid.

5. A system as claimed in claim 1, wherein the diameter D of said cylinder and the diameter D' of said aerator including said cylinder and blades is such that D' minus D is less than 0.4 D'.

6. A system as claimed in claim 1, wherein said first and second series of blades are connected to said surface of said cylinder along helical lines of connection.

7. A system as claimed in claim 6, wherein each said line of connection forms a constant angle of from 5° to 20° with the generatricies of said surface of said cylinder.

8. A system as claimed in claim 1, wherein each of said blades is connected to said surface of said cylinder along a line of connection forming a constant angle of from 5° to 20° with the generatricies of said surface of said cylinder.

9. A system as claimed in claim 1, wherein each said blade has a line of greatest slope forming with a radius of said cylinder a constant angle of from 30° to 60°.

10. A system as claimed in claim 9, wherein said angle is approximately 45°.

11. A system as claimed in claim 1, wherein the diameter of said cylinder is from 600 to 900 mm, and the length of said cylinder is less than or equal to 10 m.

12. A system as claimed in claim 1, wherein said blades divide the periphery of said surface of said cylinder into from 6 to 12 equal sized surface sections.

13. A system as claimed in claim 1, wherein the immersion depth of said blades is from $D'-D/3$ to $D'-D$, wherein D equals the diameter of said cylinder, and D' equals the diameter of said aerator including said cylinder and said blades.

14. A system as claimed in claim 1, further comprising deflector hood means, positioned at a location above an area downstream of said aerator, for deflecting downstream of said aerator waste water driven upwardly form the surface of said body of waste water by said blades.

15. A system as claimed in claim 1, further comprising water guide means, positioned within said body of waste water and extending across the entire width thereof at a location downstream of said aerator, for guiding the flow of said waste water due to rotation of said aerator.

16. A system as claimed in claim 15, wherein said water guide means is positioned with the upper edge thereof at the surface of said body of waste water and inclined in an upstream direction at an angle to the horizontal of from 40° to 60°.

17. A system as claimed in claim 15, wherein the height h' of said water guide means is 0.10H<h'<0.30H, wherein H equals the depth of said body of waste water, and said water guide means is spaced downstream from said aerator by a horizontal distance l' in meters such that $$\frac{V^2}{2g} < l' < 2.5 \frac{V^2}{2g}.$$

wherein V equals the peripheral speed at the outer ends of said blades in m/sec, and g equals 9.81 m/sec².

18. A horizontal axis aerator for use in a waste water purification system and adapted to be mounted across and partially immersed in a body of waste water to be treated and rotated therein, said aerator comprising:
- a cylinder having an axis and adapted to be mounted with said axis extending horizontally;
- a first series of parallel blades on the surface of said cylinder and extending in directions nonparallel to said axis;
- a second series of parallel blades on said surface of said cylinder and extending in directions nonparallel to said axis;
- said directions of said first series of blades being opposite to said directions of said second series of blades with respect to said axis;
- said first and second series of blades intersecting each other, such that upon the aerator being partially immersed in a body of waste water to be treated and being rotated therein, at any rotational position of said aerator about said axis a constant portion of the total blade length of all of said blades of said aerator will be immersed in the waste water; and
- each said blade being inclined with respect to said surface of said cylinder in a direction opposite to the direction of rotation.

19. An aerator as claimed in claim 18, wherein each of said blades of said first and second series of blades is divided into plural blade sections at the points of intersection of said first and second series of blades, and each said blade section has a full length in the respective said direction of at least 0.5 m.

20. An aerator as claimed in claim 18, wherein said cylinder is hollow.

21. An aerator as claimed in claim 18, wherein said blades are rigid.

22. An aerator as claimed in claim 18, wherein the diameter D of said cylinder and the diameter D' of said aerator including said cylinder and said blades is such that D' minus D is less than 0.4 D'.

23. An aerator as claimed in claim 18, wherein said first and second series of blades are connected to said surface of said cylinder along helical lines of connection.

24. An aerator as claimed in claim 23, wherein each said line of connection forms a constant angle of from 5° to 20° with the generatricies of said surface of said cylinder.

25. An aerator as claimed in claim 18, wherein each of said blades is connected to said surface of said cylinder along a line of connection forming a constant angle of from 5° to 20° with the generatricies of said surface of said cylinder.

26. An aerator as claimed in claim 18, wherein each said blade has a line of greatest slope forming with a radius of said cylinder a constant angle of from 30° to 60°.

27. An aerator as claimed in claim 26, wherein said angle is approximately 45°.

28. An aerator as claimed in claim 18, wherein the diameter of said cylinder is from 600 to 900 mm, and the length of said cylinder is less than or equal to 10 m.

29. An aerator as claimed in claim 18, wherein said blades divide the periphery of said surface of said cylinder into from 6 to 12 equal sized surface sections.

* * * * *